(12) United States Patent
Dieker et al.

(10) Patent No.: US 11,236,213 B2
(45) Date of Patent: Feb. 1, 2022

(54) WATER-SOLUBLE OR DISPERSIBLE POLYESTER RESINS MADE FROM TEREPHTHALATE PLASTIC MATERIALS USEFUL AS DISPERSANT RESINS FOR INKS

(71) Applicant: SUN CHEMICAL CORPORATION, Parsippany, NJ (US)

(72) Inventors: Jürgen Dieker, Karlstein am Main (DE); Robert Deighton, Rochdale (GB); Kai-Uwe W. Gaudl, Freigericht (DE); Leonora Nurcaj-Dreshaj, Karlstein am Main (DE)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/265,078

(22) PCT Filed: Jan. 6, 2020

(86) PCT No.: PCT/US2020/012330
§ 371 (c)(1),
(2) Date: Feb. 1, 2021

(87) PCT Pub. No.: WO2020/146240
PCT Pub. Date: Jul. 16, 2020

(65) Prior Publication Data
US 2021/0246282 A1 Aug. 12, 2021

Related U.S. Application Data

(60) Provisional application No. 62/789,014, filed on Jan. 7, 2019.

(51) Int. Cl.
| | | |
|---|---|---|
| *C08G 63/18* | (2006.01) | |
| *C08J 11/24* | (2006.01) | |
| *C08G 63/183* | (2006.01) | |
| *C08G 63/85* | (2006.01) | |
| *C09D 11/104* | (2014.01) | |

(52) U.S. Cl.
CPC ............ *C08J 11/24* (2013.01); *C08G 63/183* (2013.01); *C08G 63/85* (2013.01); *C09D 11/104* (2013.01); *C08G 2150/00* (2013.01); *C08G 2170/00* (2013.01); *C08J 2367/02* (2013.01)

(58) Field of Classification Search
USPC ....... 521/48.5; 528/190, 193, 194, 271, 272, 528/274
See application file for complete search history.

(56) References Cited

U.S. PATENT DOCUMENTS

| | | | |
|---|---|---|---|
| 3,951,886 A | 4/1976 | Miyake et al. | |
| 4,977,191 A | 12/1990 | Salsman | |
| 5,252,615 A | 10/1993 | Rao et al. | |
| 5,726,277 A * | 3/1998 | Salsman | ............ C09D 167/02 528/272 |
| 5,958,601 A | 9/1999 | Salsman | |
| 6,127,436 A * | 10/2000 | Chatterjee | ............... C08J 11/26 521/48.5 |
| 6,353,036 B1 | 3/2002 | Yasumura et al. | |
| 6,803,389 B2 | 10/2004 | Kawamura et al. | |
| 8,637,586 B2 * | 1/2014 | Bohannon | ................ C09D 5/00 522/72 |
| 10,611,879 B2 * | 4/2020 | Mukerjee | ............... C07C 69/82 |
| 2014/0134534 A1 | 5/2014 | Sacripanie et al. | |

FOREIGN PATENT DOCUMENTS

| | | | |
|---|---|---|---|
| JP | H05 247371 A | 9/1993 | |
| WO | WO 00/24802 A1 | 5/2000 | |
| WO | WO-0024802 A1 * | 5/2000 | ............. C08J 11/26 |
| WO | WO-2015171433 A1 * | 11/2015 | .......... C08G 63/916 |
| WO | WO 201705275 A1 | 11/2017 | |

OTHER PUBLICATIONS

International Search Report issued in International Application No. PCT/US2020/012330, dated Apr. 14, 2020.
Written Opinion of the International Searching Authority issued in International Application No. PCT/US2020/012330, dated Apr. 14, 2020.
International Preliminary Report on Patentability (Chapter 1 of the Patent Cooperation Treaty) issued in International Application No. PCT/US2020/012330, dated Oct. 13, 2016.

* cited by examiner

*Primary Examiner* — Terressa Boykin
(74) *Attorney, Agent, or Firm* — Marian E Fundytus; Ostrolenk Faber LLP.

(57) ABSTRACT

The present invention provides water-soluble or water-dispersible polyester resins prepared by depolymerizing a terephthalate plastic material in an alcoholysis/glycolysis reaction, and re-polymerizing the product by reacting with a polybasic acid and/or anhydride. The polyester resins of the invention contain 70% to 95% by weight of the terephthalate material, based on the total weight of the composition. The polyester resins of the present invention are useful as dispersants, for example in pigment preparations, and as binders in let-down varnishes, inks, coatings, etc, and as adhesion promoters in aqueous-based inks.

22 Claims, No Drawings

WATER-SOLUBLE OR DISPERSIBLE POLYESTER RESINS MADE FROM TEREPHTHALATE PLASTIC MATERIALS USEFUL AS DISPERSANT RESINS FOR INKS

CROSS REFERENCE TO RELATED APPLICATIONS

The present application is a § 371 National Phase application based on PCT/US2020/012330 filed 6 Jan. 2020, which claims the benefit of U.S. Provisional Application No. 62/789,014, filed 7 Jan. 2019 the subject matter of each of which is incorporated by reference in their entirety.

FIELD OF THE INVENTION

The present invention relates to polyester resins made by depolymerizing, then repolymerizing terephthalate plastics. The polyester resins of the present invention contain high amounts of the terephthalate material. Advantageously, the polyester resins of the present invention are prepared using waste terephthalate plastic materials. The polyester resins of the present invention are useful as pigment dispersants, binder resins, and adhesion promoters in aqueous-based inks.

BACKGROUND

Polyethylene terephthalate (PET) waste, whether post-consumer or non-post-consumer, can be chemically recycled by depolymerization in a glycol or multivalent alcohol, followed by a repolymerization reaction with a polybasic acid to produce new polyesters.

U.S. Pat. No. 6,353,036 describes a polyester made from a preferred weight ratio of the polyhydric alcohol to PET ranging from 30:37 to 90:10. The examples contain about 30 wt % PET. The acid value of the polyesters described therein is 20 to 40 mg KOH/g.

U.S. Pat. No. 3,951,886 teaches a process for producing a polyester resin which comprises depolycondensing 1.0 mol polyester waste with 1.05 to 2.0 moles of at least one polyol in the presence of about 0.005 to 0.1% of at least one titanyl oxalate, based on the weight of polyester waste. The polyester resins have an acid value below 20 mg KOH/g.

U.S. Pat. No. 5,252,615 teaches an aqueous coating composition derived from the alcoholysis of polyethylene terephthalate where the number of OH equivalents from the alcohol should be equal to, or in excess of, the number of equivalents of ethylene glycol from the PET. The compositions contain less than 30 wt % PET.

US patent application US 2014/0134534 claims polyester toner resins that are composed substantially of biodegradable and recycled materials. As shown in Example 4 of the application, the recycled PET content in the resin is 32% by weight, whereas the overall score of >90% sustainability is achieved by using e.g. rosin fumarate in the repolymerization step. In addition, no preferred acid value is discussed, and the only disclosed acid value is 12.1 mg KOH/g.

U.S. Pat. No. 6,803,389 claims a process for producing a polyester resin, wherein the PET, polyhydric alcohol, and polybasic acid must be reacted concurrently. The ratios of the regenerated polyester occupying 10 to 80%, preferably 20-70%, for example 30-60%, by weight based on the total weight of the PET, polyhydric alcohol, and polybasic acid. The polyesters given in the examples have amounts of around 40% PET. In Example 3, the polyester with the highest amount of rPET is disclosed. The latter is made from rPET in an amount of 66 wt %, but the corresponding polyester has an acid value of below 5 mg KOH/g, which is not suitable for applications in aqueous media. The process as described in U.S. Pat. No. 6,803,389 is optimized for polyesters with low acid values. As shown in Example 5 of the present patent application (vide infra), it is hard to control/stop the process at specific acid values if the process of U.S. Pat. No. 6,803,389 is used, especially if polyesters with acid values higher than 40 mg KOH/g are desired. Furthermore, U.S. Pat. No. 6,803,389 does not disclose the use of a fatty acid in the polyester.

U.S. Pat. No. 5,958,601 discloses hydrophobic polyesters which are made of a maximum of 70 wt % of terephthalate polymer. The examples contain a maximum of 57% PET. Moreover, the acid value of the examples is less than 10 mg KOH/g.

U.S. Pat. No. 4,977,191 teaches PET based polyesters that have a maximum of 50 wt % in the formula of the polyester, and the examples generally have only about 40 wt % or less PET. In addition, the polyesters taught have an acid value of only 15 to 20 mg KOH/g.

There is still a high demand to have high loads of recycled materials in newly developed polyesters. From an environmental perspective, it is highly desired to have as much plastic waste in the new materials as possible. However, poor compatibility and stabilization limits the amount of PET waste in materials, especially if they shall be used in an aqueous medium, which is preferred for environmental reasons.

SUMMARY OF THE INVENTION

The present invention is directed to polyester resins made by an alcoholysis/glycolysis of terephthalate polymers to de-polymerize them, and re-polymerization by reacting with an acid or anhydride. The present invention is also directed to methods of making the terephthalate polyester resins of the present invention.

In one aspect, the present invention provides a method of preparing a water-soluble or water-dispersible polyester resin composition comprising subjecting a terephthalate polymer to a glycolysis/alcoholysis reaction, and re-polymerization reaction;
wherein said glycolysis/alcoholysis reaction comprises reacting:
  (A) 70% to 95% by weight of at least one terephthalate polymer, based on the total weight of the composition; and
  (B) 0.5% to 30% by weight of at least one mono-, bi-, or higher-valent alcohol or oxyalkylated alcohol, based on the total weight of the composition;
in order to get a reaction mixture; and
wherein said re-polymerization comprises adding to the reaction mixture:
  (C) 0.5% to 30% by weight of at least one polybasic carboxylic acid and/or anhydride, based on total weight of the composition;
wherein the addition of the polybasic acid and/or anhydride is done either:
  i) sequentially, wherein all of the polybasic acid or anhydride is added to the reaction mixture after the glycolysis reaction has run for about 30 to 200 minutes, and/or the mixture exhibits a 15-minute clear peel, and/or the glycolysis reaction is run until there is essentially no reflux; or
  ii) essentially sequentially, wherein a portion of the polybasic acid and/or anhydride is added to the reaction mixture in the beginning at the same time as the terephthalate polymer and alcohol, with the remainder of the polybasic acid and/or anhydride being added:
  a) after the glycolysis reaction has run for about 30 to 200 minutes; and/or
  b) after the mixture exhibits a 15-minute clear peel; and/or
  c) after the glycolysis reaction is run until there is essentially no reflux;

wherein the ratio of the polybasic acid and/or anhydride added at the beginning of the reaction to the polybasic acid added after the glycolysis reaction has run for about 30 to 200 minutes and/or the mixture exhibits a 15-minute clear peel, and/or the glycolysis reaction is run until there is essentially no reflux, is 1:99 to 99:1;

wherein the polyester resin has an acid value equal to or greater than 40 mg KOH/g; and wherein the polyester resin has a glass transition temperature (Tg) equal to or greater than 40° C.

In certain embodiments, the water-soluble or water-dispersible polyester resin of the present invention has an acid value equal to or greater than 45 mg KOH/g, or equal to or greater than 50 mg KOH/g.

The present invention also provides coatings, pigment preparations, or pigmented waterborne inks, comprising the polyester resins of the present invention.

In another embodiment, the present invention provides articles comprising the pigmented preparations of the present invention.

These and other objects, advantages, and features of the invention will become apparent to those persons skilled in the art upon reading the details of the formulations and methods as more fully described below.

DETAILED DESCRIPTION OF THE INVENTION

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

The present invention provides water-soluble or water-dispersible polyester resins having an acid value equal to or greater than 40 mg KOH/g, and a glass transition temperature (Tg) equal to or greater than 40° C., made by glycolysis of terephthalate polymers and re-polymerization with monoacid, polyacid, or anhydride functional materials, or a combination thereof. Advantageously, the polyester resins of the present invention comprise greater than 70% by weight terephthalate polymers. The water-soluble or water-dispersible polyesters of the present invention are made by an alcoholysis/glycolysis reaction where the number of OH equivalents from the alcohol(s) is much lower than previously described processes. In many instances, the OH-equivalents from the alcohol(s) is less than a third of the number of equivalents of ethylene glycol from the terephthalate plastic material, based on the stoichiometric amounts calculated from the composition.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

As used herein, "substrate" means any surface or object to which an ink or coating can be applied. Substrates include, but are not limited to, cellulose-based substrates, paper, paperboard, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, the terms "comparative," "standard," and "control" are used interchangeably, and refer to polyester resins and/or dispersants that are commercially available.

As used herein, "acid value" is the weight in milligrams of KOH required to neutralize the pendant carboxylate groups in one gram of polymer.

As used herein, "Tg" or "glass transition temperature" is the temperature range where a thermosetting polymer changes from a hard, rigid or "glassy" state to a more pliable, compliant or "rubbery" state.

As used herein, "terephthalate polymer" refers to any polymer comprising within its structure a terephthalate group. Terephthalate polymers include, but are not limited to polyethylene terephthalate (PET), polybutylene terephthalate (PBT), or poly(cyclohexanedimethanol terephthalate) (PCT). Terephthalate polymers also include terpolyesters, such as poly(ethylene-co-1,4-cyclohexanedimethanol terephthalate) or poly(butylene-co-1,4-cyclohexanedimethanol terephthalate). The terephthalate polymers may be obtained from any source, such as virgin, waste, recycled, etc.

As used herein, the terms "glycolysis reaction," or "glycolysis," or "depolymerization reaction," or "depolymerization" refer to the reaction of the terephthalate polymer with at least one alcohol, resulting in a depolymerization/glycolysis product.

As used herein, the terms "esterification reaction," or "esterification," or "repolymerization reaction," or "repolymerization" refer to the reaction of the depolymerization/glycolysis product with at least one polybasic acid and/or anhydride, resulting in a polyester resin of the present invention.

As used herein, the term "reflux", "heating at reflux" and the like, is a technique used to run reactions at elevated temperatures, involving the condensation of vapors and the return of the condensate to the system from which it originated, thereby allowing for extended times for running a reaction without losing the liquid. A mixture of reactants and solvents is placed in a suitable vessel, wherein the vessel is connected to a condenser. The mixture is heated to the desired temperature, and maintained at this temperature to run the reaction. The liquid can generally be observed forming in the condenser and flowing back into the reaction, for example as droplets or a continuous stream.

In the context of the present invention, the solvents and solvent mixtures typically act as both solvents and reactants, and are consumed during the reaction.

As used herein, the phrases "until there is essentially no reflux," "until almost no reflux is observed," or "until there is almost no reflux," refers to a reaction wherein the solvents act as both solvents and reactants, and means that at least 50% of the solvent or solvent mixture has been consumed as reactants. Preferably, 70% to 100% of the solvent or solvent mixture has been consumed as reactants. Although not required, the amount of condensate observed flowing back into the reaction may be reduced at this point. Without being bound by theory, the inventors believe that at this point, where almost no reflux is observed, the glycolysis reaction is at equilibrium.

As used herein, "15-minute clear peel" or "clear peel method" refers to a method for assessing the progress of the depolymerization/glycolysis reaction. In the clear peel method, a drop of the reaction mixture is placed on a glass plate. The depolymerization is complete if the peel of the reaction mixture on the glass plate stays clear for 15 minutes or longer when the glass plate is stored on a lab bench at room temperature.

As used herein, the glycolysis reaction and esterification reaction being run "sequentially" means that terephthalate polymer and alcohol are added to the reaction vessel, and the glycolysis reaction of the terephthalate polymer and the alcohol is run until the glycolysis reaction has run for about 30 to 200 minutes and/or the mixture exhibits a 15-minute clear peel, and/or the glycolysis reaction is run until there is essentially no reflux, at which point the the polybasic acid and/or anhydride is added either in portions or all at once.

As used herein, the glycolysis reaction and esterification reaction being run "essentially sequentially" means that the terephthalate polymer and alcohol, and a portion of the polybasic acid and/or anhydride are added to the reaction vessel, and the reaction run until the glycolysis reaction has run for about 30 to 200 minutes and/or the mixture exhibits a 15-minute clear peel, and/or the glycolysis reaction is run until there is essentially no reflux, at which point the remainder of the polybasic acid and/or anhydride is added. The ratio of the polybasic acid and/or anhydride added at the beginning of the reaction to the polybasic acid and/or anhydride added after the glycolysis reaction has run for about 30 to 200 minutes and/or the mixture exhibits a 15-minute clear peel, and/or the glycolysis reaction is run until there is essentially no reflux, is 1:99 to 99:1, such as 50:50, 75:25, or 90:10.

Polyester Resins

It was surprisingly found that it is possible to introduce equal to or greater than 70 wt % loads of terephthalate polymers, preferably waste terephthalate plastic materials such as recycled polyethethylene terephthalate (rPET), in new polyesters, as described herein. Preferably, the polyester resins of the present invention comprise equal to or greater than 75 wt % terephthalate plastic materials. In certain embodiments, the polyester resins of the present invention comprise equal to or greater than 80 wt % of terephthalate plastic materials. Surprisingly, the new polyesters are very useful as dispersants for water-based inks for which acid numbers of at least 40 mg KOH/g and glass transition temperatures of at least 40° C. are required.

The resins of the present invention are preferably made from waste terephthalate polymers, including bottles, sheet material, textile wastes, and the like. The waste terephthalate plastics may be bought from recyclers and include, but are not limited to, material from bottle recyclers, yarn recyclers, and the like. The recycling companies offer terephthalate polymers, such as rPET, in different grades, often specified by intrinsic viscosity (IV) of the material, color (multicolor, specific color (e.g. blue), clear or transparent), and forms/sizes (e.g. flakes, pellets, or grind). It is an advantage of this invention that the actual source of the terephthalate polymer usable herein is not of critical importance to this invention. "Virgin" terephthalate polymer, that is, a terephthalate polymer like PET which is specifically produced as a raw material, is acceptable from a chemical standpoint for use herein. Likewise, recycled or reclaimed PET is acceptable from a chemical standpoint. At the time of this application, there are advantages to the environment (reduction of solid waste) for using recycled or reclaimed PET versus virgin PET. As a consequence, recycled or reclaimed terephthalate polymer is a preferred starting material, although it should be appreciated that any source of relatively pure terephthalate polymer is acceptable. Almost all sources and grades of rPET materials can be used, and are compatible with the polyester polymers and the process disclosed in the present invention. The terephthalate can be characterized by the unit formula:

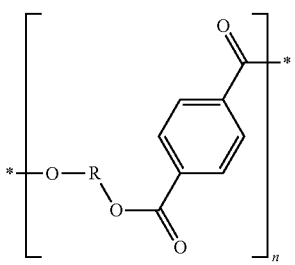

wherein:
R is an aliphatic or cycloaliphatic alkyl with 2 to 10 carbon atoms; and
n is an integer from 3 to 800.

Preferably, the waste terephthalate polymer is polyethylene terephthalate (PET), polybutylene terephthalate (PBT), or poly(cyclohexanedimethanol terephthalate) (PCT), or mixtures thereof.

Terephthalate polymer is present in an amount of about 70 wt % to about 95 wt %, based on the total weight of the composition. For example, the terephthalate polymer may be used in an amount of about 70 wt % to about 90 wt %, based on the total weight of the composition; or about 70 wt % to about 85 wt %; or about 70 wt % to about 80 wt %; or about 70 wt % to about 75 wt %; or about 75 wt % to about 95 wt %; or about 75 wt % to about 90 wt %; or about 75 wt % to about 85 wt %; or about 75 wt % to about 80 wt %; or about 80 wt % to about 95 wt %; or about 80 wt % to about 90 wt %; or about 80 wt % to about 85 wt %; or about 85 wt % to about 95 wt %; or about 85 wt % to about 90 wt %; or about 90 wt % to about 95 wt %.

When polyesters with a terephthalate polymer content of equal to or greater than 70 wt % are targeted, it is a preferred procedure if portions of the terephthalate polymer are added during the depolymerization step to the reactor filled with the hydroxyl functional compounds. In a preferred embodiment, the portions are small in the beginning, but increase while the reaction runs, and the liquid part of the reaction mixture increases, improving heat transfer.

The preferred method is a sequential addition of terephthalate polymer in the reactor and reacting in a glycolysis reaction with any hydroxyl functional compound, obtaining a depolymerized product which is then reacted with the acid(s) and/or anhydrides (e.g. isophthalic acid, dimer acid, and/or trimellitic anhydride). The resulting polymers have an acid value equal to or greater than 40 mg KOH/g, and a Tg equal to or greater than 40° C., within acceptable reaction times, and in a way allowing for easy control of the final acid value.

The polyester resins can be made by heating virgin or waste terephthalate polymer with alcohols. Preferred are polyhydric alcohols, compounds having at least two hydroxyl groups. They can be linear or branched, aliphatic, and/or cycloaliphatic compounds. Typically, $C_3$-$C_{10}$ glycols are preferred. Polyhydric alcohols include, but are not limited to: isosorbide; isomannide; 1,2-ethylene glycol; diethylene glycol; propylene glycol; dipropylene glycol; tripropylene glycol; 1,3-propanediol; polyethylene glycol; polypropylene glycol; 2-methyl-1,3-propanediol; 1,2-butanediol; 1,3-butanediol; 1,4-butanediol; 1,6-hexanediol; neopentyl glycol (2,2-dimethyl-1,3-propanediol); 2-butyl-2-ethyl-3-propanediol; 2,2,4-trimethyl-1,3-pentanediol; 3-methyl-1,5-pentanediol; ethoxylated neopentylglycol; propoxylated neopentylglycol; 1,4-cyclohexanedimethanol; bisphenol-A; ethoxylated bisphenol-A; hydrogenated bisphenol-A; an alkylene oxide adduct of hydrogenated bisphenol-A; and trifunctional or higher functional polyhydric alcohols, such as glycerol, trimethylolpropane, ethoxlaed trimethylolpropane, propoxylated trimethylolpropane, ethoxylated or propoxylated glycerol; pentaerythritol, ethoxylated pentaerythritol, propoxylated pentaerythritol, and alkoxylated glycerol; and combinations thereof. Preferred are diethylene glycol and glycerol.

The polyhydric alcohol is typically present in an amount of about 0.5 wt % to about 30 wt %, based on the total weight of the composition. For example, the polyhydric alcohol may be present in an amount of about 0.5 wt % to about 25 wt %, based on the total weight of the composition; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 30 wt %; or about 10 wt % to about 25 wt %; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %.

The depolymerization reaction is preferably carried out at a temperature of between 160° C. and 260° C., preferably between 190° C. and 240° C., and more preferably between 220° C. and 240° C. Typically, the depolymerization reaction occurs over a period of about 30 minutes to 12 hours, such as from about 2 to 5 hours, e.g. 2-4 hours. In certain embodiments, the depolymerization reaction is run over a period of about 30 minutes to 200 minutes. Advantageously, the depolymerization reaction is carried out until the solid terephthalate polymer and polyhydric alcohol mixture is converted into a clear and/or homogenous mixture, or into a melt solution that contains no visible terephthalate polymer particles. The progress of the depolymerization may be assessed by the clear peel method. In the clear peel method, a drop of the reaction mixture is placed on a glass plate. The depolymerization is complete if the peel of the reaction mixture on the glass plate stays clear for 15 minutes or longer when the glass plate is stored on a lab bench at room temperature.

The depolymerization reaction can be carried out at atmospheric, sub-atmospheric, or supra-atmospheric pressure, but is preferably carried out at atmospheric pressure. Preferably, the depolymerization reaction is carried out under an inert atmosphere, such as, for example, nitrogen or argon.

The depolymerization product that is obtained can range from a polymeric glass to a viscous liquid. Furthermore, the color of the depolymerization product depends on the quality of the terephthalate plastic material used. Optionally, if low quality terephthalate plastic is used, for example post-consumer multicolor PET bottles with a large amount of insoluble impurities such as paper labels on the bottles or rub-off parts collected in the process of mechanical cutting of the bottles, then the depolymerization product is filtered after the described depolymerization step. The depolymerization product is a clear product at the reaction temperature, but can be opaque if the reaction mixture is cooled to lower temperatures.

The depolymerization product obtained as described above is preferably esterified after the depolymerization reaction is run for about 30 to 200 minutes and/or the mixture exhibits a 15-minute clear peel, and/or the depolymermization reaction is run to the point where there is essentially no reflux, by the reaction with at least one polybasic carboxylic acid and/or anhydride. That is, the depolymerization and repolymerization are run sequentially. It is to be understood that the esterification reaction is an equilibrium reaction, and some amount of depolymerization will occur during the repolymerization reaction.

In another embodiment, the reactions are run essentially sequentially, wherein the terephthalate polymer, alcohol, and a portion of the polybasic acid and/or anhydride are added to the reaction vessel/mixture, and the reaction is run until the glycolysis reaction has run for about 30 to 200 minutes and/or the mixture exhibits a 15-minute clear peel, and/or the glycolysis reaction is run until there is essentially no reflux, at which point the remainder of the polybasic acid and/or anhydride is added. The ratio of the polybasic acid and/or anhydride added at the beginning of the reaction to the polybasic acid and/or anhydride added after the glycolysis reaction has run for about 30 to 200 minutes and/or the mixture exhibits a 15-minute clear peel, and/or the glycolysis reaction is run until there is essentially no reflux is 1:99 to 99:1, such as 50:50, 75:25, or 90:10.

Although not preferred, in certain embodiments, all of the reaction products can be added at the beginning, and the esterification reaction can be run concurrently with the depolymerization reaction.

Optionally, a monomeric acid can be used as well. The monomeric acid may be a monomeric fatty acid. In one embodiment, a mixture of a monomeric acid such as a fatty acid and a polybasic carboxylic acid are used, but it is also possible to just use the polybasic carboxylic acid alone.

In the context of the present invention, the term "polybasic acid" is meant to extend to the corresponding anhydrides. A mixture of acids and anhydrides may also be used. Polybasic carboxylic acids include, but are not limited to: unsaturated polybasic acids, such as maleic acid, maleic anhydride, fumaric acid, and itaconic acid; aliphatic saturated polybasic acids, such as malonic acid, succinic acid, adipic acid, azelaic acid, and sebacic acid; aromatic saturated polybasic acids such as pthalic anyhydride, isophthalic acid, terephthalic acid, trimellitic acid, 2,6-naphthlenedicarboxylic acid; and alicyclic polybasic acids, such as tetrahydrophthalic anhydride, hexahydro-4-methylphthalic anhydride (MHHPA), 1,2-hexahydrophthalic anhydride, 1-4-cyclohexanedicarboxylic acid, and andic acid. A preferred acid derivative is a di-carboxy aromatic carboxylic acid or anhydride. In certain embodiments, preferred acids include adipic acid, isophthalic acid, trimellitic acid, and mixtures thereof. Most preferred are isophthalic acid and trimellitic acid.

The polybasic acid and/or anhydride is typically present in an amount of about 0.5 wt % to about 30 wt %, based on the total weight of the composition. For example, the polybasic acid and/or anhydride may be present in an amount of about about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 30 wt %; or about 10 wt % to about 25 wt %; or about 10 wt % to about 20 wt %; or about 10 wt % to about 15 wt %; or 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %. Advantageously, the polybasic acid is used in an amount of about 0.5 wt % to about 20 wt %, based on the total weight of the composition.

The fatty acid that is used is typically a dimer fatty acid and/or trimer fatty acid, with dimer fatty acids being preferred. As used herein, the term "dimer fatty acid" is synonymous with "dimerized fatty acid" or "dimer acid." Dimer fatty acids are chemical intermediates made by dimerizing unsaturated fatty acids (e.g. oleic acid, linoleic acid, linolenic acid, ricinoleic acid) in the presence of a catalyst, such as bentonite or montmorillonite clay. Commercially available dimer fatty acids are usually mixtures of products in which the dimerized product predominates. Some commercial dimer acids are made by dimerizing tall oil fatty acids. Dimer fatty acids frequently have 36 carbons and two carboxylic acid groups. They may be saturated or unsaturated. They may also be hydrogenated to remove unsaturation.

Fatty acids include, but are not limited to, dimerized oleic acid, trimerized oleic acid, dimerized linoleic acid, trimerized linoleic acid, dimerized linolenic acid, trimerized linolenic acid, and mixtures thereof. Suitable dimer fatty acids include Pripol™ dimer fatty acids (products of Croda), such as Pripol 1006, 1009, 1010, 1012, 1013, 1017, 1022, 1025, 1027, 1029, 1036, and 1098; Unidyme™ dimer acids (products of Arizona Chemical) such as Unidyme 10, 14, 18, 22, 35, M15, and M35; dimer acids available from Emery Oleochemicals, and FloraDyme™ dimer acids from Florachem Corporation. Preferred are dimerized oleic acid, dimerized linoleic acid, and/or dimerized ricinoleic acid.

The advantage of incorporating one or more fatty acids (typically dimer fatty acids) in the structure of the inventive compounds is that it is commonly accepted that such fatty acids improve pigment wetting. Moreover, we surprisingly observed that, in selected examples, by the inclusion of fatty acids in the structure of the inventive compounds, the resin remains clear and transparent, even if the obtained inventive resin is poured out of the reaction vessel and cooled to room temperature. Without being bound to theory, it is believed that the long alkyl chains of the fatty acid help to prevent the terephthalate polymer which is incorporated in high amounts in the inventive resins from crystallizing. Advantageously, polyester resins comprising fatty acids, which are clear and transparent, are particularly useful as binder resins.

The fatty acids, when used, are preferably added in an amount less than 30 wt %, based upon the total weight of the composition, and advantageously they are added in an amount between 0.5 and 20 wt %. For example, the fatty acids may be added in an amount less than about 25 wt %; or less than about 20 wt %; or less than about 15 wt %; or less than about 10 wt %; or less than about 5 wt %; or less than about 1 wt %. For example, the fatty acids may be added in an amount of about 0.5 wt % to about 30 wt %, based on the total weight of the composition; or about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 30 wt %; or about 10 wt % to about 25 wt %; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %.

The esterification reaction is preferably carried out at a temperature of 180° C. to 250° C. Preferably, the esterification reaction is carried out in an inert atmosphere, such as nitrogen or argon. Typically, the esterification reaction is carried out at a pressure of 5,000 to 150,000 Pa, preferably 10,000 to 120,000 Pa, and most preferably at atmospheric pressure.

Typically, the esterification reaction is carried out until the acid value of the reaction mixture is about 20 to 150 mg KOH/g, and preferably about 40 to 140 mg KOH/g, depending on the application of the resulting inventive polyester resin. The polyester may be in the form of a clear hard solid resin or an opaque hard resin at room temperature. Typically, the polyester has a number average molecular weight (Mn) of about 500 to 10,000 Dalton (Da), and a weight average molecular weight (Mw) of about 1,000 to 50,000 Da. For example, the Mn is preferably about 1,000 to 7,000 Daltons, and the Mw is preferably about 4,000 to 30,000 Daltons.

A preferred product is that obtained by heating waste terephthalate polymer, diethylene glycol, and glycerol above 200° C. to produce an intermediate product, which is characterized by a 15-minute clear peel, and heating the thus obtained intermediate product with polybasic acid, such as isophthalic acid, and/or fatty acid such as dimer acid, at a temperature of at least 150° C. Advantageously, the compounds of the invention have at least one fatty acid incorporated into the structure. In one embodiment, at least one fatty acid is incorporated. The term fatty acid covers mono fatty acids, as well as polymerized fatty acids such as dimer fatty acids and/or trimer fatty acids. In the present invention, the fatty acid is typically a polymerized fatty acid, and most typically it is a dimer acid and/or a trimer fatty acid. Dimer fatty acids are preferred.

Polyester resins comprising trimellitic acid or trimellitic anhydride are preferably made by heating an isophthalic acid-containing intermediate with trimellitic acid or trimellitic anhydride. It is preferred to obtain an intermediate, having a 15 minute clear peel, before reaction with isophthalic acid, and then with trimellitic acid or anhydride.

Resins made from waste terephthalate polymer, glycol, and isophthalic acid are preferably made by heating waste terephthalate polymer with at least one glycol at about 190° C. or higher, to produce an intermediate product characterized by a 15 minute clear peel. The intermediate product is mixed with isophthalic acid and heated at a temperature of at least 150° C. To get the high amount of waste terephthalate polymer into the product, it is advantageous to add the waste terephthalate polymer in portions to the glycol or intermediate, otherwise there is only a very limited amount of liquid which will react with the high amount of solid waste terephthalate.

Preferred terephthalate polymer feeds are polyethylene terephthalate (PET), polybutylene terephthalate (PBT), or poly(cyclohexanedimethanol terephthalate) (PCT). However, any suitable terephthalate polymer may be used.

Preferred glycols are diethylene glycol, propylene glycol, glycerol, and mixtures of some or all of such compounds. However, any suitable glycol may be used.

A preferred product is that comprising a reaction product of 70% to 90% by weight of polyethylene terephthalate (PET), 0.1% to 10% by by weight of diethylene glycol, 0.1% to 20% by weight of glycerol, and 1% to 30% by weight of isophthalic acid, and, optionally, 3% to 15% by weight of trimellitic acid or trimellitic anhydride.

A preferred water-soluble or water-dispersible polyester resin comprises a reaction product of 70% to 93% by weight of PET, 0.1% to 10% by weight of diethylene glycol, 0.1% to 15% by weight of glycerol, 1% to 30% by weight isophthalic acid, and 0.1% to 20% by weight fatty acid. A highly preferred water-soluble or water-dispersible polyester resin comprises a reaction product of 70% to 93% by weight of PET, 0.1% to 10% by weight of diethylene glycol, 0.1% to 15% by weight of glycerol, 0.1% to 10% by weight of propylene glycol, 1% to 30% by weight of isophthalic acid, 1% to 20% by weight fatty acid, and 0% to 15% by weight of trimellitic acid or trimellitic anhydride.

When used, the trimellitic acid and/or anhydride is typically used in an amount of about 3% to 15% by weight, based on the total weight of the composition. For example, the trimellitic acid and/or anhydride may be used in an amount of about 3% to about 10% by weight, based on the total weight of the composition; or about 3% to about 5%; or about 5% to about 15%; or about 5% to about 10%; or about 10% to about 15%.

The polyester resins are usually made using an ester-interchange catalyst. But it is possible to omit the addition of a catalyst, and do the reaction e.g. at slightly elevated temperatures.

Ester-interchange catalysts are well known organometallic compounds, particularly compounds of tin or titanium. Suitable catalysts include, but are not limited to, tetraalkyl titanates, in which each alkyl moiety has up to 8 carbon atoms; alkyl stannoic acids, such as monobutyl stannoic acid; dialkyl tin oxides, such as dioctyl tin oxide. Preferred catalysts include monobutyl stannoic acid and tetrapropyl or tetrabutyl titanate, or mixtures thereof.

When used, the ester-interchange catalysts are typically used in an amount of about 0.001 wt % to about 3 wt %, based on the total weight of the composition. For example, the ester-interchange catalyst may be present in an amount of about 0.001 wt % to about 2.5 wt %, based on the total weight of the composition; or about 0.001 wt % to about 2 wt %; or about 0.001 wt % to about 1.5 wt %; or about 0.001 wt % to about 1 wt %; or about 0.001 wt % to about 0.5 wt %; or about 0.001 wt % to about 0.1 wt %; or about 0.001 wt % to about 0.05 wt %; or about 0.001 wt % to about 0.01 wt %; or about 0.01 wt % to about 3 wt %; or about 0.01 wt % to about 2.5 wt %; or about 0.01 wt % to about 2 wt %; or about 0.01 wt % to about 1.5 wt %; or about 0.01 wt % to about 1 wt %; or about 0.01 wt % to about 0.5 wt %; or about 0.01 wt % to about 0.1 wt %; or about 0.01 wt % to about 0.05 wt %; or about 0.05 wt % to about 3 wt %; or about 0.05 wt % to about 2.5 wt %; or about 0.05 wt % to about 2 wt %; or about 0.05 wt % to about 1.5 wt %; or about 0.05 wt % to about 1 wt %; or about 0.05 wt % to about 0.5 wt %; or about 0.05 wt % to about 0.1 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 3 wt %; or about 1 wt % to about 2.5 wt %; or about 1 wt % to about 2 wt %; or about 1 wt % to about 1.5 wt %; or about 1.5 wt % to about 3 wt %; or about 1.5 wt % to about 2.5 wt %; or about 1.5 wt % to about 2 wt %; or about 2 wt % to about 3 wt %; or about 2 wt % to about 2.5 wt %; or about 2.5 wt % to about 3 wt %.

Usually, the resins of the present invention are grinded to a particle size of about 1.5 mm or less. The resinous products obtained can be taken up in relatively concentrated aqueous (may contain small amounts of biocide and alcohol) solutions of alkali metal, or ammonium hydroxides, or ammonium carbonates. The concentration employed can be determined by routine experimentation. However, if shipping of the concentrated aqueous solutions to a point of use is contemplated, it is preferred to produce highly concentrated solutions. It is within the scope of the present invention to produce initial solutions or dispersions containing 20% to 30% or more of resin solids.

The compositions of the present invention are used, for example, as dispersion resins for pigments. Other uses include, but are not limited to, use as a binder resin, or a resin to improve adhesion in an aqueous based ink system (e.g. flexographic, digital, etc.).

For most applications of the present invention, the resins are either taken up in a solution of an alkali metal, ammonium carbonate or hydroxide, or by an amine base to the desired concentration. Or a relatively concentrated solution or dispersion in an aqueous alkali metal, ammonium hydroxide or carbonate can be diluted with water to the desired concentration.

The concentration of material to be applied to a substrate can readily be determined by routine experimentation. However, preferably, the solution or dispersion of water-soluble or water-dispersible resin being applied as a dispersant resin contains 0.1% to 10% of resin solid. Preferably, the solution or dispersion contains 0.5% to 5% of resin solid. For example, when used as a dispersant, the solution or dispersion of water-soluble or water-dispersible resin may contain about 0.1% to about 5% of resin solid; or about 0.1% to about 1%; or about 0.1% to about 0.5%; or about 0.5% to about 10%; or about 0.5% to about 5%; or about 0.5% to about 1%; or about 1% to about 10%; or about 1% to about 5%; or about 5% to about 10%.

If the resins of the present invention are used as binder resins, the concentration of material to be applied to the substrate is usually higher. The solution or dispersion of water-soluble or water-dispersible resin being applied as a let-down varnish may contain up to 40% of the resins of the present invention. For example, the solution or dispersion of water-soluble or water-dispersible resin being applied as a let-down varnish may contain up to 35% of the resins; or up to 30%; or up to 25%; or up to 20%; or up to 15%; or up to 10% of the resins of the present invention. The solution or dispersion of water-soluble or water-dispersible resin being applied as a let-down varnish may contain at least 1%, or at least 5%, or at least 10% of resins of the present invention. For example, the solution or dispersion of water-soluble or water-dispersible resin being applied as a let-down varnish may contain about 10% to about 40% of the resin of the present invention; or about 10% to about 35%; or about 10% to about 30%; or about 10% to about 25%; or about 10% to about 20%; or about 10% to about 15%; or about 15% to about 40%; or about 15% to about 35%; or about 15% to about 30%; or about 15% to about 25%; or about 15% to about 20%; or about 20% to about 40%; or about 20% to about 35%; or about 20% to about 30%; or about 20% to about 25%; or about 25% to about 40%; or about 25% to about 35%; or about 25% to about 30%; or about 30% to about 40%; or about 30% to about 35%; or about 35% to about 40%.

When used as a binder in a let-down varnish, the polyester resins of the present invention may be mixed with any acrylic dispersion or solution before use in an aqueous coating.

When used as an adhesion promoter in aqueous based ink systems, the solution or dispersion of water-soluble or water-dispersible resin of the present invention typically comprises up to 40% of the resins of the present invention. For example, the solution or dispersion of water-soluble or water-dispersible resin being used as an adhesion promoter may contain up to 35% of the resins; or up to 30%; or up to 25%; or up to 20%; or up to 15%; or up to 10% of the resins of the present invention. The solution or dispersion of water-soluble or water-dispersible resin being used as an adhesion promoter may contain at least 1%, or at least 5%, or at least 10% of resins of the present invention. For example, the solution or dispersion of water-soluble or water-dispersible resin being used as an adhesion promoter may contain about 10% to about 40% of the resin of the present invention; or about 10% to about 35%; or about 10% to about 30%; or about 10% to about 25%; or about 10% to about 20%; or about 10% to about 15%; or about 15% to about 40%; or about 15% to about 35%; or about 15% to about 30%; or about 15% to about 25%; or about 15% to about 20%; or about 20% to about 40%; or about 20% to about 35%; or about 20% to about 30%; or about 20% to about 25%; or about 25% to about 40%; or about 25% to about 35%; or about 25% to about 30%; or about 30% to about 40%; or about 30% to about 35%; or about 35% to about 40%.

In one embodiment, a preferred water-soluble or water-dispersible polyester comprises a reaction product of 70% to 90% by weight of PET or PCT, or mixtures thereof, 0.01% to 5% by weight of diethylene glycol, 0.1% to 10% by weight of glycerol, and 5% to 20% by weight of isophthalic acid.

In another embodiment, a preferred polyester resin comprises a reaction product of 70% to 90% by weight of PET, 0.01% to 5% by weight of diethylene glycol, 0.1% to 10% by weight of glycerol, 2% to 20% by weight of isophthalic acid, and 2% to 20% by weight of either trimellitic acid, or trimellitic anhydride, or dimer acid.

The resin as described above is grinded to a particle size of about 1.5 mm or less. The resin particles may be taken up at room temperature, or at an elevated temperature of up to about 95° C., by a solution of an aqueous alkali metal, or ammonium hydroxide or carbonate, at the desired concentration to form a dispersion. Or, the hot liquid as obtained when the synthesis is finished is taken up directly in a solution of an aqueous alkali metal, or ammonium hydroxide or carbonate, at the desired concentration, to form a dispersion.

Surprisingly, it was found that such a resin solution or dispersion, if applied as described below, improves the color strength of aqueous inks, as shown in Examples 8 to 10. The resin can be used in any known form to prepare a pigment preparation (base mix), taking advantage of the dispersion properties of the polyester resins of the present invention.

The present invention further provides easily dispersible pigment preparations (mill base mix) comprising the polyester resins of the present invention and pigments. Preferred pigment preparations comprise 5% to 99% by weight, more preferably 35% to 90% by weight, of at least one pigment; 0.5% to 30% by weight, preferably 0.7% to 10% by weight, of a polyester resin of the present invention; and 0% to 10% by weight, preferably 0.01% to 5% by weight, of an auxiliary agent such as fillers, flame retardants, preservatives, photoprotectants, pigmentary and non-pigmentary dispersants, surfactants, antioxidants, defoamers, resins, and antistatic agents; each based on the total weight of the pigment preparation.

Organic pigments are preferred. Useful organic pigments include, but are not limited to, monoazo, disazo, laked azo, β-naphthol, Naphthol AS, benzimidazolone, disazo condensation, azo metal complex pigments, and polycyclic pigments such as for example phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or an acidic to alkaline carbon black from the group consisting of furnace blacks and gas blacks. Particularly suitable organic pigments are finely ground, wherein preferably 95%, and more preferably 99% of the pigment particles have a particle size less than or equal to 500 nm.

Useful organic pigments include, but are not limited to, carbon black pigments, for example gas or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81.

The pigment preparations of the present invention may include customary auxiliary agents such as fillers, flame retardants, preservatives, photoprotectants, pigmentary and non-pigmentary dispersants, surfactants, antioxidants, resins, defoamers and antistatic agents. The auxiliary agents are typically present in an amount of 0.1% to 20% by weight, based on the total weight of the pigment preparation.

Suitable surfactants for the pigment preparations of the present invention include, but are not limited to: alkyl sulfates, such as lauryl sulfate, stearyl sulfate, or octadecyl sulfate; primary alkyl sulfonates, such as dodecyl sulfonate; secondary alkyl sulfonates, such as $C_3$-$C_{17}$-alkanesulfonate sodium salt; alkyl phosphates; alkyl benzenesulfonates, such as dodecylbenzenesulfonic acid; salts thereof; and the like. It is also possible to use soy lecithin; condensation products of fatty acid; taurine or hydroxyethanesulfonic acid; alkoxylation products of alkylphenols, castor oil resins, fatty alcohols, fatty amines, fatty acids, and fatty acid amides. These alkoxylation products may comprise ionic end groups, for example as sulfosuccinic monoesters, or else as sulfonic, sulfuric and phosphoric esters, as well as their salts, the sulfonates, sulfates, or phosphates. Also suitable are alkoxylated addition compounds obtained by the reaction of polyepoxides with amines, or bisphenol A, or bisphenol A derivatives with amines, and also urea derivatives.

The present invention further provides a process for producing the pigment preparations of the present invention, characterized in that the pigment in the form of a powder, granulate or presscake is mixed with the polyester resin of the present invention in the presence of water, or an organic solvent, or a mixture of water and organic solvent. Auxiliary agents as described above may also be included in the mixture.

The pigment preparations obtained by the process of the present invention can, if necessary, be isolated in solid form, for example, by filtration, decanting, centrifugation, spray drying, fluidized bed drying, belt drying, spray granulation, or drying in a paddle dryer. The pigment preparations of the present invention are preferably used as obtained in water. However, the pigment preparations may be isolated by filtration, and final drying. When the pigment preparation obtained has a coarse particle size, it is advantageously additionally subjected to a dry grinding operation.

The pigment preparations according to the present invention are useful for pigmenting and coloring natural and synthetic materials of any kind. For example, they are useful for pigmenting or coloring printing inks, paints, coating systems, such as wallpaper colors, emulsions, and varnishes, that are water and/or solvent containing.

The pigment preparations according to the present invention are further useful for coloration of macromolecular materials of any kind. For example, they may be used to color natural and synthetic fibers, such as cellulose fibers, paper pulp dyeing, and laminate coloration. Further applications are the manufacture of printing inks, including, but not limited to, textile print pastes, flexographic printing inks, offset printing inks, inkjet inks, especially water-based inkjet inks, decorative printing colors or gravure printing inks, wallpaper colors, water-thinnable varnishes, wood preservation systems, varnishes, glass, in particular glass bottles, and also graphic inks, washing and cleaning compositions, latex products, and also for coloring plastics.

The pigment preparations of the present invention can further be used for printing all manner of coated or uncoated substrate materials. Substrate materials include, but are not limited to, paperboard, cardboard, wood and wood-base materials, metallic materials, semiconductor materials, ceramic materials, glasses, glass fibers, and ceramic fibers. The substrate may be two-dimensionally planar, or spatially extended, i.e. three-dimensionally structured. The substrate may be printed or coated completely with the pigment preparation of the present invention, or may be only partially printed or coated with the pigment preparation of the present invention.

An effectively pigmenting amount is usually between about 0.01% and 99% by weight of pigment preparation, based on the total weight of the composition or organic material to be pigmented. For example, an effectively pigmenting amount may be between 0.01% and 40% by weight, or between 5% and 99% by weight, based on the total weight of the composition or organic material to be pigmented.

EXAMPLES

The following examples illustrate specific aspects of the present invention, and are not intended to limit the scope thereof in any respect, and should not be so construed.

Examples 1 to 7 are syntheses of polyester resins of the present invention, and a comparative resin.
Methods
Molecular weight Molecular weight was measured by Gel Permeation Chromatography (GPC) using three GPC columns (manufactured by PSS (Polymer Standards Service-USA, Inc), SDV 5 µm 1000 Å, SDV 5 µm 500 Å, SDV 5 µm 100 ÅA, flow rate: 1.0 ml/min, eluent: tetrahydrofuran, column temperature: 40° C., monodisperse polystyrene equivalent molecular weight calibration. A differential refractive index detector (RI) was used.

For Examples 1 to 7, described below, a 1000 ml four-neck flask reactor suitable for high temperature cooking was used for the reactions. The flask was equipped with a gas inlet, a thermometer, a mechanical stirrer, and a condenser which allows switching between collecting and reflux mode. The reactions were carried out under an inert atmosphere.
Acid Value Acid value (acid number) is the mass of KOH in mg required to neutralize one gram of polyester resin. Acid value was determined using the following procedure:
  A 0.2 g to 1 g sample was weighed into a clean 50 ml Erlenmeyer flask.
  The sample was dissolved in an appropriate organic solvent, which, if necessary, was neutralized before use (e.g. acetone or tetrahydrofuran (THF)).
  Three drops of alcoholic phenolphthalein solution was added.
  The solution was titrated with standardized 0.1 N alcoholic potassium hydroxide
  (KOH) to first pink color that lasted for 15 seconds, and the amount (in ml) of KOH added was recorded.

The acid value was calculated according to the following formula:

Acid number=[(ml KOH)(0.1)(56.1)]/[sample weight (g)] wherein 0.1 is the normality of the KOH solution; and wherein 56.1 g/mol is the molecular weight of KOH.

Glass Transition Temperature (Tg)

Differential Scanning calorimetry (DSC) was used to measure the major transitions. Heating rates were 10° C. per minute in a sealed pan under nitrogen atmosphere. All samples were subjected to two scans starting a room temperature and ending at an appropriate temperature well above the Tg. Measurement of phase transition temperature was performed by using a differential scanning calorimeter (DSC) equipped with a temperature control stage. The Tg was defined as the first change in the slope of the thermogram after heating.
Clear Peel The progress of depolymerization was assessed by the clear peel test. At various stages during the depolymerization of the terephthalate polymer a drop of the reaction mixture was placed on a glass plate. The depolymerization was complete when the drop on the glass plate stayed clear for 15 minutes or longer when the glass plate was stored on a lab bench at room temperature.

Example 1

Synthesis of Polyester Resins 1A and 1B

Polyester resin 1A and 1B were synthesized according to the formula in Table 1. The full amount of the PET was added to the reaction mixture all at once during depolymerization. The isophthalic acid was added all at once during repolymerization. The depolymerization and repolymerization steps were conducted as sequential reactions, i.e. the PET and alcohol were reacted to depolymerize the PET; when the depolymerization reaction was essentially complete, then the isophthalic acid was reacted with the depolymerized PET to repolymerize, producing the terephthalate polyester resin of the invention. In Examples 1A and 1B, the OH-equivalents from ethylene glycol being part of the PET were 0.84, and the OH-equivalents from the alcohol(s) were 0.1004. Thus, the ratio of PET OH/alcohol OH was 8.07.

TABLE 1

| Formulation of polyester resin 1A and 1B | |
|---|---|
| Materials | Weight-% |
| Recycled PET (e.g. WSR 484*) | 81.04 |
| Glycerol | 3.01 |
| Diethylene glycol | 0.21 |
| Tyzor TPT (Tetra propyl titanate) | 0.03 |
| Isophthalic acid | 15.71 |
| Total | 100.0 |

*Obtained from WSR Advanced Raw Materials GmbH, Rosendahl, Germany; type 484 is a colorless material.

The PET, diethylene glycol, glycerol, and Tyzor TPT were added into the reactor and heated in a nitrogen stream up to 230-240° C., for about 30 to 180 minutes, until completely molten (generally about two hours to get a quantity of 600 g completely molten). Depolymerization was monitored by the clear peel test. At about 240° C. most of the material was molten, and stirring was started. The resulting clear mixture was stirred at 240° C. for one hour. At this point, almost no refluxing was observed. Then, isophthalic acid was added, and the mode was changed from reflux to collection mode. About 4 ml of a liquid was collected at 240 to 250° C. at about 2 hours after the mode was changed. The obtained clear resin was poured out of the flask, forming an opaque brittle resin at room temperature, which was grinded to small particles. The whole process for a scheduled quantity of 600 g took about five hours.

Polyester resin 1A properties:
Mn/Mw: 2.2 kDa/9.9 kDa
Acid value: 70 mg KOH/g
Tg: 69° C.

Polyester resin 1B was synthesized with the same formulation as Example 1A, except that the reaction was run until the acid value was 80 mg KOH/g. PET was added to the reaction mixture in two parts: the first half of the PET was added to the reactor together with the full amount of diethylene glycol, glycerol, and Tyzor TPT, and heated in a nitrogen stream up to 230-240° C., for about 40 minutes; then the second part of the PET was added. The melting process of the reaction mixture took about 100 minutes. Then, the reaction was continued as described in Example 1A. The scheduled quantity of this example was 1000 g.

Polyester resin 1B properties:
Mn/Mw: 1.5 kDa/4.9 kDa
Acid value: 80 mg KOH/g
Tg: 64.4° C.

Example 2

Synthesis of Polyester Resin 2.

Polyester resin 2 was synthesized according to the formulation in Table 2. The full amount of PET was added into the reaction mixture all at once. The isophthalic acid was added all at once during repolymerization. The depolymerization and repolymerization steps were conducted as sequential reactions, i.e. the PET and alcohol were reacted to depolymerize the PET; when the depolymerization reaction was essentially complete, then the isophthalic acid was reacted with the depolymerized PET to repolymerize, producing the terephthalate polyester resin of the invention. The OH equivalents from ethylene glycol being part of the PET were 0.76, and the OH equivalents from the alcohol(s) were 0.16. Thus, the ratio of PET OH/alcohol OH was 4.75.

TABLE 2

Formulation of polyester resin 2

| Materials | Weight-% |
| --- | --- |
| Recycled PET (WSR 484) | 73.8 |
| Glycerol | 2.9 |
| Diethylene glycol | 4.0 |
| Tyzor TPT (Tetra propyl titanate) | 0.1 |
| Isophthalic acid | 19.2 |
| Total | 100.0 |

PET, diethylene glycol, glycerol, and Tyzor TPT were added into the reactor and heated in a nitrogen stream up to 225-245° C. for about 60-120 minutes, until completely molten (generally about 50 minutes to get 450 g of material clear and completely molten). To complete the depolymerization reaction, the resulting clear mixture was stirred at 240° C. for one hour. Almost no reflux was observed at this point. Then, isophthalic acid was added and the mode was changed from reflux to collection mode. In the course of the reaction, which was continued at 240-250° C. for about two and a half hours, the reaction mixture became clear/transparent. The obtained clear resin was poured out of the flask, but turned opaque upon cooling to room temperature. The whole process for a scheduled quantity of 450 g took about five hours.

Properties of polyester resin 2:
Mn/Mw: 1.2 kDa/3.3 kDa
Acid value: 63.5 mg KOH/g
Tg: 61° C.

Example 3

Synthesis of Polyester Resin 3.

Polyester resin 3 was synthesized according to the formula in Table 3. The PET was divided into two portions, which were added separately at different times to the reaction mixture during depolymerization. The isophthalic acid was divided into portions, and added at different times to the reaction mixture during repolymerization. The depolymerization and repolymerization steps were conducted as sequential reactions, i.e. the PET and alcohol were reacted to depolymerize the PET; when the depolymerization reaction was essentially complete, then the isophthalic acid was reacted with the depolymerized PET to repolymerize, producing the terephthalate polyester resin of the invention. The OH equivalents from ethylene glycol being part of the PET were 0.78, and the OH equivalents from alcohol(s) were 0.156. Thus, the ratio PET OH/alcohol OH was 5.0

TABLE 3

Formulation of polyester resin 3

| Materials | Weight-% |
| --- | --- |
| Recycled PET (WSR 484) | 75.0 |
| Glycerol | 3.0 |
| Diethylene glycol | 3.0 |
| Tyzor TPT (Tetra propyl titanate) | 0.1 |
| Isophthalic acid | 15.1 |
| Trimellitic anhydride | 3.8 |
| Total | 100.0 |

Diethylene glycol, glycerol, Tyzor TPT and the first half of the complete amount of rPET material were added into the reactor and heated in a nitrogen stream to about 215-235° C., for about 30 to 180 minutes, until all of the material was molten (about 90 minutes for a scheduled quantity of 400 g). Then, the second half of the rPET material was added to the reaction mixture and the depolymerization reaction was continued. At about 240° C. most of the material was molten, and stirring was begun. A clear/transparent mixture was obtained. Heating was continued at 240° C. for one hour, resulting in a reaction mixture showing almost no reflux anymore. The mode was changed from reflux to collection mode. Isophthalic acid was added in two parts to prevent cooling the reaction mixture too much upon addition of the cold isophthalic acid, which could result in solidification of the reaction mixture. When the temperature was stabilized at 240° C., the trimellitic anhydride was added. About 3 ml of the liquid were collected at 240-245° C. after about one hour. The acid value of the reaction mixture was monitored, and when the desired acid value was obtained, the clear transparent (slightly yellow) resin was poured out of the flask. The resin turned opaque upon cooling.
Mn/Mw: 1.6 kDa/5.5 kDa
Acid value: 81 mg KOH/g
Tg: 78.1° C.

Example 4

Synthesis of Polyester Resins 4A and 4B

Polyester resins 4A and 4B were synthesized according to the formulation in Table 4 below. The depolymerization and repolymerization steps were conducted as sequential reactions, i.e. the PET and alcohol were reacted to depolymerize the PET; when the depolymerization reaction was essentially complete, then the isophthalic acid was reacted with the depolymerized PET to repolymerize, producing the terephthalate polyester resin of the invention. In Examples 4A and 4B, the OH equivalents from ethylene glycol being part of the PET were 0.84, and the OH equivalents from alcohol(s) were 0.156. Thus, the ratio of PET OH/alcohol OH was 5.38.

TABLE 4

Formulation of polyester resins 4A and 4B

| Materials | Weight-% |
| --- | --- |
| Recycled PET (WSR 484) | 80.0 |
| Glycerol | 3.0 |
| Diethylene glycol | 3.0 |
| Tyzor TPT (Tetra propyl titanate) | 0.1 |
| Isophthalic acid | 11.1 |
| Dimer acid (Unidyme 18) | 2.8 |
| Total | 100.0 |

Diethylene glycol, glycerol, Tyzor TPT, and one sixth of the amount of rPET were added into the reactor and heated in a nitrogen stream up to 245° C., and after about 60 minutes of heating the reaction mixture was completely molten. The remaining amount of rPET was added in three portions at 245° C., at intervals. The rPET was added in separate portions at intervals so that the reaction mixture temperature was maintained. The reaction mixture was stirred at 245° C. for about 2 hours before the mode was changed from reflux to collection mode, and isophthalic acid was added. The temperature was stabilized at 245° C., and 30 minutes after the addition of the isophthalic acid, the dimer acid (Unidyme 18) was added. The decrease of the acid value of the reaction mixture was monitored, and when the desired acid value was obtained, the clear transparent (slightly yellow) resin was poured out of the flask. The resin stayed clear on cooling to room temperature. The whole process from charging the reactor until pouring the final product out of the flask took about 6 hours.
Properties of polyester resin 4A:
Mn/Mw: 2.0 kDa/5.5 kDa
Acid value: 71.0 mg KOH/g
Tg: 54.3° C.
Polyester resin 4B was synthesized generally according to the formulation and process of polyester resin 4A, except that the reaction was run for one hour at 245° C. after the addition of the Unidyme was complete. A clear resin was obtained.
Properties of polyester resin 4B:
Mn/Mw: 1.1 kDa/3.4 kDa
Acid value: 52 mg KOH/g
Tg: 60.5° C.

Example 5

Synthesis of Comparative Polyester Resin 5

Comparative polyester resin 5 was prepared generally with the formulation as used in Example 4, but rather than adding the reagents sequentially, all of the reagents were added to the reactor right at the beginning, and the depolymerization and repolymerization reactions were run concurrently (the method used in U.S. Pat. No. 6,803,389). The formulation of comparative polyester resin 5 is shown in Table 5. The OH equivalents from ethylene glycol being part of the PET were 0.84, and the OH equivalents from alcohol(s) were 0.156. Thus, the ratio of PET OH/alcohol OH was 5.38.

TABLE 5

Formulation of comparative polyester resin 5

| Materials | Weight-% |
| --- | --- |
| Recycled PET (WSR 484) | 80.0 |
| Glycerol | 3.0 |
| Diethylene glycol | 3.0 |
| Tyzor TPT (Tetra propyl titanate) | 0.1 |
| Isophthalic acid | 11.1 |
| Dimer acid (Unidyme 18) | 2.8 |
| Total | 100.0 |

All six components in Table 5 were added into the reactor at room temperature, and heated in a nitrogen stream up to 230° C. The reactor was run in collection mode from the beginning. After about 60 to 150 minutes all material was molten/dissolved and a clear reaction mixture was obtained. The clear mixture was allowed to react at 240-250° C. for one hour. The obtained clear resin already had an acid number of only 44 mg KOH/g, and was immediately poured out of the flask. The whole process from charging the components to the reactor to pouring the product out of the flask took about 4 hours. However, the acid number was hard to control. The inventors have found that, in general, when all of the components are added at once in the beginning and reacted concurrently, the acid number is hard to control, especially if acid values higher than 40 mg KOH/g are the target of the synthesis. A clear resin was obtained.
Mn/Mw: 2.4 kDa/7.3 kDa
Acid value: 44.4 mg KOH/g
Tg: 52.5° C.

Example 6

Synthesis of Polyester Resin 6

Polyester resin 6 was synthesized according to the formulation in Table 6. The depolymerization and repolymerization steps were conducted as sequential reactions, i.e. the PET and alcohol were reacted to depolymerize the PET; when the depolymerization reaction was essentially complete, then the isophthalic acid was reacted with the depolymerized PET to repolymerize, producing the terephthalate polyester resin of the invention. The OH equivalents from ethylene glycol being part of the PET were 0.88, and the OH equivalents from the alcohol(s) were 0.104. Thus, the ratio PET OH/alcohol OH was 8.46.

TABLE 6

Formulation of polyester resin 6

| Materials | Weight-% |
| --- | --- |
| Recycled PET (WSR 484) | 85.0 |
| Glycerol | 3.0 |
| Diethylene glycol | 0.2 |
| Tyzor TPT (Tetra propyl titanate) | 0.1 |
| Isophthalic acid | 11.7 |
| Total | 100.0 |

Diethylene glycol, glycerol, Tyzor TPT and the first half of the rPET material were added into the reactor, and heated in a nitrogen stream to 215-235° C., until the reaction became molten (about 30 to 180 minutes; a scheduled quantity of 450 g took 2 hours). Then, the second half of the rPET material was added to the reaction mixture, and the depolymerization reaction continued. At about 240° C. most of the material was molten, and stirring began. A clear/transparent mixture was obtained. Heating was continued at 240° C. for one hour, resulting in a reaction mixture showing almost no reflux anymore. The mode was changed from reflux to collection mode. Isophthalic acid was added in two parts, to prevent the mixture from cooling on addition of the cold isophthalic acid (which could solidify the reaction mixture). The liquid was collected at 240 to 245° C. after about one hour. The acid value of the reaction mixture was monitored, and when the desired acid value was obtained, the clear transparent (slightly yellow) resin was poured out of the flask. The resin turned opaque on cooling.

Mn/Mw 2.5 kDa/9.4 kDa
Acid value: 71.0 mg KOH/g
Tg: 71.8° C.

Example 7

Synthesis of Polyester Resin 7

Polyester resin 7 was prepared using the general procedure of Example 6, but with the formulation shown in Table 7. The depolymerization and repolymerization steps were conducted as sequential reactions, i.e. the PET and alcohol were reacted to depolymerize the PET; when the depolymerization reaction was essentially complete, then the isophthalic acid was reacted with the depolymerized PET to repolymerize, producing the terephthalate polyester resin of the invention. The OH equivalents from ethylene glycol being part of the PET were 0.94, and the OH equivalents from the alcohol(s) were 0.104. Thus, the ratio PET OH/alcohol OH was 9.

TABLE 7

Formulation of polyester resin 7

| Materials | Weight-% |
| --- | --- |
| Recycled PET (WSR 484) | 90.0 |
| Glycerol | 3.0 |
| Diethylene glycol | 0.2 |
| Tyzor TPT (Tetra propyl titanate) | 0.1 |
| Isophthalic acid | 6.7 |
| Total | 100.0 |

An opaque resin was obtained.
Mn/Mw: could not be determined because the resin had limited solubility in THF
Acid value: 42 mg KOH/g
Tg: 63.7° C.

Examples 8 to 10 were conducted to test the polyester resins of the invention as dispersants in pigment mill bases, compared to a commercially available dispersant, Synperonic™. Synperonic is a trademark of Croda International Plc UK. Synperonic T908 is advertised to be a versatile water-solube oil-in-water emulsifier, and effective dispersant for solid particles in water or lower alcohols. Yellow, cyan, and magenta mill base mixes were prepared as described below, using either a commercially available dispersant (8A, 9A, 10A), or a polyester resin of the present invention as a dispersant (8B, 9B, 10B).

Example 8

Preparation of Yellow Mill Base Mixes 8A (Comparative) and 8B (Inventive)

Comparative yellow mill base mix 8A and inventive yellow mill base mix 8B were prepared according to the formulations in Table 8.

TABLE 8

Formulations of yellow mill base mixes 8A and 8B

| Materials | Weight-% (Comp. 8A) | Weight-% (Inv. 8B) |
| --- | --- | --- |
| Defoamer (e.g. Byk-017) | 0.5 | 0.5 |
| Monopropylene glycol | 2.0 | 2.0 |
| Biocide (e.g. Acticide) | 0.2 | 0.2 |
| Berol (non-ionic surfactant) | 9.4 | 9.4 |
| Flexiverse ® SunChemical (30% solids) (organic pigment preparation) | 19.7 | 19.7 |
| Example 1 (Inventive Dispersant solution) | — | 3.7 |
| Synperonic T908 (Comparative Dispersant solution) | 3.7 | — |
| Demineralized Water | 23.0 | 23.0 |
| Pigment Yellow 13 (e.g. Panax GF-967T) | 41.5 | 41.5 |
| Total | 100.0 | 100.0 |

Comparative Example 8A: Synperonic T908 (comparative dispersant solution, 25 wt % solids in water) was added to demineralized water in a standard screw topped honey jar with stirring, and stirring was continued until a clear solution was obtained. Panax GF-967T pigment, defoamer (Byk-017), monopropylene glycol, biocide, non-ionic surfactant (Berol), organic pigment preparation (Flexiverse), and 2 mm steel shot were added to the clear solution, and the mixture was shaken on a mechanical shaker for 2 hours. The mill base obtained was filtered to remove the metal shot and used in testing.

Inventive Example 8B: The mill base was made by the procedure as described above in Example 8A, except that the inventive polyester resin 1 of Example 1 was used instead of Synperonic T908. The hard resin obtained in Example 1 was added dry at 25% of the amounts shown above, and the remainder was added to the water.

Example 9. Preparation of Cyan Mill Base Mixes 9A (Comparative) and 9B (Inventive)

Cyan mill base mixes using Sunfast Blue 15:3 pigment were made by the method of Example 8, but using the formulations as shown in Table 9.

TABLE 9

Formulation of cyan mill base mixes 9A and 9B

| Materials | Weight-% (Comp. 9A) | Weight-% (Inv. 9B) |
|---|---|---|
| Defoamer (e.g. Byk-017) | 0.6 | 0.6 |
| Monopropylene glycol | 2.2 | 2.2 |
| Biocide (e.g. Acticide) | 0.2 | 0.2 |
| Berol (non-ionic surfactant) | 10.8 | 10.8 |
| Flexiverse ® SunChemical (30% solids) (organic pigment preparation) | 18.5 | 18.5 |
| Example 1 (Inventive Dispersant solution, 25 wt-% solids in water) | — | 4.3 |
| Synperonic T908 (Comparative Dispersant solution) | 4.3 | — |
| Demineralized Water | 17.3 | 17.3 |
| Sunfast Blue 15:3 | 46.1 | 46.1 |
| Total | 100.0 | 100.0 |

Example 9A is a comparative cyan mill base, and Example 9B is an inventive cyan mill base.

Example 10

Preparation of Magenta Mill Base Mixes 10A (Comparative) and 10B (Inventive)

Mill base mixes of magenta using a combination of three magenta 51:1 pigments (Symuler Carmine, Sincol Rubine 3160, and Sunbrite Red 5:1) were made by the method of Example 8, except according to the formulations shown in table 10.

TABLE 10

Formulation of magenta mill base mixes 10A and 10B

| Materials | Weight-% (Comp. 10A) | Weight-% (Inv. 10B) |
|---|---|---|
| Defoamer (e.g. Byk-017) | 0.5 | 0.5 |
| Monopropylene glycol | 2.1 | 2.1 |
| Biocide (e.g. Acticide) | 0.2 | 0.2 |
| Berol (non-ionic surfactant) | 14.7 | 14.7 |
| Flexiverse ® SunChemical (30% solids) | 29.9 | 29.9 |
| Example 1 (Inventive Dispersant solution, 25 wt-% solids in water) | 0 | 4.2 |
| Synperonic T908 (Comparative Dispersant solution, 25 wt-% solids in water) | 4.2 | 0 |
| Demineralized Water | 12.3 | 12.3 |
| Symuler Carmine | 18.9 | 18.9 |
| Sincol Rubine 3160 | 9.4 | 9.4 |
| Sunbrite Red 57:1 | 7.8 | 7.8 |
| Total | 100.0 | 100.0 |

Example 10A is a comparative magenta mill base mix, and Example 10B is an inventive magenta mill base mix.

Example 11

Properties of Inks Prepared Using Inventive and Comparative Mill Base Mixes

Tinted white paints and tinted clear paints were prepared using the mill base mixes described above. Color strength of the mill base mixes was tested using the white reduction test, and transparency of the tinted clear paint was assessed by visual inspection.

The color strength and transparency of the inventive and comparative mill base mixes were tested side by side. A compatible standard white paste was prepared to evaluate the tinting strength of the colored mixtures. The formulation of the standard white paste is shown in Table 11.

TABLE 11

Formulation of standard white paste

| Materials | Weight-% |
|---|---|
| Defoamer (e.g. Byk-017) | 0.5 |
| Biocide | 0.3 |
| Acrylic resin, 30% solids (e.g. Joncryl ® 678 in water) | 12.2 |
| Wetting additive for aqueous printing inks (e.g. Disperbyk 190) | 8.1 |
| Demineralized Water | 13.2 |
| Titanium dioxide (Rutile) (e.g. Tioxide RDIS) | 65.7 |
| Total | 100.0 |

Tinted clear paint was prepared by thoroughly mixing the mill base mixes as described above with a commercially available water-borne blending clear (Neocryl A1094), in an amount of 20% mill base and 90% Neocryl A1094. Mixture C clear paints are comparative tinted clear paints prepared using the comparative base mixes 8A, 9A, and 10A. Mixture D clear paints are inventive clear paints using inventive base mixes 8B, 9B, and 10B. The general formulation of tinted clear paints is shown in Table 12.

TABLE 12

Formulation of tinted clear paints

| | Mixture C | Mixture D |
|---|---|---|
| Mill base (Comparative) | 20% | — |
| Mill base (Inventive) | — | 20.0% |
| Neocryl A1094 | 80% | 80.0% |

Tinted white paints were prepared by adding 10% of the tinted clear paint Mixtures C or D with 90% of the compatible standard white paste, and mixing thoroughly. The general formulation of tinted white paints is shown in Table 13.

TABLE 13

Formulation of tinted white paints

| | Standard Mix | Inv. Mix |
|---|---|---|
| Mixture C (Comparative) | 10.0% | — |
| Mixture D (Inventive) | — | 10.0% |
| Standard White Paste | 90.0% | 90.0% |

The polyester resins of the invention were tested as dispersants, and were assessed for their ability to disperse pigment by comparing prints of comparative/standard tinted clear paints and tinted white paints, to inventive tinted clear paints and tinted white paints. Samples were assessed for transparency and color strength by visual inspection and instrumental measurement, and for gloss by instrumental measurement. This was done for each color (yellow, cyan, magenta).

Methods

Printing/Drawdown

The tinted white paints were applied on a K bar proofer (RK PrintCoat Instruments Ltd., UK) with a number 2 K-bar, side by side at the same time and with the same film weight. K-bar number 2 applies a 12-micron thick wet film, and the proofer was run on speed 10. Drawdowns (prints) on substrate Lumiere 170 g/m$^2$ were measured/assessed as described below.

The tinted clear paints were applied in the same manner, but on the substrate black/white Leneta chart.

FS Strength

The full strength (FS strength) color was assessed for prints of the pigments on the substrate. The FS strength is expressed as a strength value relative to 100%, wherein 100% is the FS strength of the comparative/standard tinted paint. A value above 100% means that the FS strength of the inventive tinted paint is greater than the FS strength of the comparative/standard tinted paint.

White Strength Reduction/Tinting Strength

Tinting strength is the ability of a pigment to change the hue of another pigment, such as the depth of color produced by mixing a pigment or dye with white. In the context of the present invention, the tinting strength is assessed by white strength reduction, i.e. how much less white a tinted white ink/paint is as measured by reflectance value. White strength reduction was determined by measuring the reflectance of light over the visible region of the spectrum (400 nm to 700 nm) using an X-rite spectrophotometer, using the following setting: in QC-Tab: Job Settings: Pass/Fail DEcmc—no further selections, Get Tolerance From Standard, L:C Ratio DEcmc 2.00; DE2000/94/99 2.00; Strength Method "Weighted Sum" Adjusted Strength Target: 100.00%; Number of Visual Steps 5; Density Method: T ANSI; System Default Tolerances: Pass/Fail 1.00; Margin (%): 0.1%. Settings in General Tab: Selected Color System: CIEL*a*b*; Illuminants 1: D50-10; 2: A -10 and 3: F02-10 (CWF); Default Measurement Mode: None; Concentration Units: Percent.

The reflectance of each tinted white paint film on Lumiere sheets, prepared as described above, was measured and standard x, y, and z color coordinates were calculated. These were used to determine color strength values relative to 100%, wherein 100% is the color strength of the comparative/standard sample. The difference in color strengths or white reduction is expressed as a percentage increase/decrease in strength of the white reduction strength. Thus, if the Inventive vs. Comparative/Standard value is 122%, this means that the white reduction strength of the inventive sample is 22% greater (22% greater tinting strength than the comparative/standard sample).

Transparency

Transparency of the draw-downs (prints) were visually inspected and assessed side by side on a black/white Leneta chart. Transparency of the inventive samples was rated as higher, equivalent, or lower than the standard sample.

Gloss

Gloss was measured using a BYK-Micro Tri Gloss, at an angle of 60 degrees. The difference in gloss is expressed as a percentage increase in the gloss. Thus, if the Inventive vs. Comparative/Standard value is 122%, this means that the gloss of the inventive sample is higher.

Pigmentation Level

The pigmentation level is the amount (wt %) of pigment in the composition. See Table 8 for the yellow pigment (41.5 wt %), Table 9 for the cyan/blue pigment (46.1 wt %), and Table 10 for the sum of the three magenta/red pigments (18.9+9.4+7.8=36.1 wt %).

The results of the comparison between the inventive compositions (prepared using the polyester resin of the present invention as a dispersant) and the comparative (standard) compositions (prepared using Synperonic T908 as the dispersant) are summarized in Table 14.

TABLE 14

Properties of the inventive compositions relative to the comparative (standard) composition

|  | Yellow: Inv. vs. Comp. | Magenta: Inv. vs. Comp. | Cyan: Inv. vs. Comp. |
| --- | --- | --- | --- |
| FS strength | 101.46% | 102.11% | 111.35% |
| White strength reduction | 122.12% | 102.56% | 116.60% |
| Gloss vs Standard | 102.6% | 99.8% | 93.6% |
| Transparency vs Standard | Higher | Equivalent | Equivalent |
| Pigmentation level | 41.50 | 36.1 | 46.10 |

Discussion

The results of the tests that were performed demonstrate that the inventive water-soluble or water-dispersible polyester resins made from terephthalate plastic materials, including waste terephthalate materials, are effective in stabilizing the selected pigments. The pigments have been chosen to illustrate effectiveness as a dispersant.

The more effective the dispersant is at dispersing, the smaller will be the size of the pigment particles obtained. With smaller pigment particle, the tinted clear inks will have better transparency in visual and instrumental tests, and the tinted white inks will have better color strength, for example as determined by the white reduction test.

In yellow compositions (comprising Pigment Yellow 13, e.g. Panax GF-967T), the inventive polyester resin of the present invention produced a more transparent drawdown (print), and a tinted white that has a white reduction strength increase of 22%. Hence, the inventive terephthalate polyester resin dispersant is a much more effective dispersant for the yellow pigment than the control. The film is more transparent, has greater color strength, and is glossier. The pigment is more finely divided (i.e. smaller particles), therefore it is better dispersed and stabilized.

Magenta compositions (comprising a magenta pigment mix of Red 57:1) comprising the polyester resins of the present invention were very similar in transparency, color strength, and gloss to the compositions comprising the standard dispersant. It is to be expected from the instrumental results that the two paint films would appear to be the same. Dispersant A and B are equally effective with this pigment.

Visual assessment and instrumental measurements show that blue compositions (comprising Sunfast Blue 15:3) prepared with the polyester resins of the present invention had the same transparency as the compositions prepared with the standard dispersant. However, the inventive blue compositions are more strongly colored. This is confirmed by the white strength reduction test, showing the inventive ink has a color strength increase of about 16% compared to the standard ink.

The results of the examples discussed above show that, although made from recycled materials, the polyester resin of the present invention is a very effective dispersant, which produces finely dispersed particles which, in some examples, is even better than a commercially available control product.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method of preparing a water-soluble or water-dispersible polyester resin composition comprising subjecting a terephthalate polymer to a glycolysis/alcoholysis reaction, and re-polymerization reaction;

wherein said glycolysis/alcoholysis reaction comprises reacting:

(A) 73% to 95% by weight of at least one terephthalate polymer, based on the total weight of the composition; and (B) 0.5% to 30% by weight of at least one mono-, bi-, or higher-valent alcohol or oxyalkylated alcohol, based on the total weight of the composition;

in order to get a reaction mixture; wherein the OH equivalents from the alcohol are less than the OH equivalents from the terephthalate polymer; and wherein said re-polymerization comprises adding to the reaction mixture:

(C) 0.5% to 30% by weight of at least one polybasic carboxylic acid and/or anhydride, based on total weight of the composition;

wherein the addition of the polybasic acid and/or anhydride is done either:

i) sequentially, wherein all of the polybasic acid or anhydride is added to the reaction mixture after the glycolysis reaction has run for about 30 to 200 minutes, and/or the mixture exhibits a 15-minute clear peel, and/or the glycolysis reaction is run until there is essentially no reflux; or ii) essentially sequentially, wherein a portion of the polybasic acid and/or anhydride is added to the reaction mixture in the beginning at the same time as the terephthalate polymer and alcohol, with the remainder of the polybasic acid and/or anhydride being added:

a) after the glycolysis reaction has run for about 30 to 200 minutes; and/or b) after the reaction mixture exhibits a 15-minute clear peel; and/or c) after the glycolysis reaction is run until there is essentially no reflux;

wherein the ratio of the polybasic acid and/or anhydride added at the beginning of the reaction to the polybasic acid added after the glycolysis reaction has run for about 30 to 200 minutes, and/or the mixture exhibits a 15-minute clear peel, and/or the glycolysis reaction is run until there is essentially no reflux is 1:99 to 99:1;

wherein the polyester resin has an acid value greater than 50 mg KOH/g; and wherein the polyester resin has a glass transition temperature (Tg) equal to or greater than 40° C.

2. The method of claim 1, wherein the terephthalate polymer comprises a waste material.

3. The method of claim 1, wherein (C) further comprises 0.5% to 30% by weight of at least one fatty acid, based on the total weight of the composition.

4. The method of claim 3, wherein the fatty acid is a dimer acid.

5. The method of claim 1, wherein (C) comprises isophthalic acid.

6. The method of claim 3, comprising isophthalic acid or a dimer acid, or a combination thereof.

7. The method of claim 1, wherein the reaction mixture comprises 73% to 93% by weight of polyethylene terephthalate, 0.1% to 10% by weight of diethylene glycol, 0.1% to 15% by weight of glycerol, 1% to 20% by weight of a fatty acid, 1% to 30% by weight of isophthalic acid, all based on the total weight of the composition.

8. The method of claim 7, wherein the reaction mixture further comprises 3% to 15% by weight of trimellitic acid or trimellitic anhydride, based on the total weight of the composition.

9. The method of claim 1, wherein the reaction mixture further comprises a catalyst in an amount of 0.001% to 3% by weight, based on the total weight of the composition.

10. The method of claim 1, wherein the polyester resin has a number average molecular weight of 1,000 to 7,000 Da, and a weight average molecular weight of 4,000 to 30,000 Da.

11. The method of claim 1, comprising heating waste terephthalate polymer and glycol(s) above 150° C. to produce an intermediate product characterized by a 15 minute clear peel, and heating the thus obtained intermediate product with a polybasic acid at a temperature of at least 150° C.

12. A water-soluble or water-dispersible polyester resin prepared by the method of claim 1.

13. A composition comprising the resin of claim 12, dissolved or dispersed in water, wherein the water optionally contains an alkali metal, or ammonium hydroxide, or ammonium carbonate.

14. The composition of claim 13, diluted with water to a resin solids content of 0.5% to 30%.

15. A solid pigment preparation comprising:
a) 5% to 99% by weight of at least one pigment, based on the total weight of the pigment preparation;
b) 0.1% to 90% by weight of the resin of claim 12, based on the total weight of the pigment preparation;
c) 0% to 2% by weight of one or more auxiliary materials selected from the group consisting of fillers, flame retardants, preservatives, photoprotectants, pigmentary dispersants, nonpigmentary dispersants, surfactants, antioxidants, defoamers, resins, and antistatic agents, each based on the total weight of the pigment preparation.

16. The pigment preparation of claim 15, wherein the pigment is selected from the group consisting of monoazo, diazo, lacked azo, β-naphthol, Naphthol AS, benzimidazolone, disazo condensation, azo metal complex pigments, phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or the acidic to alkaline carbon blacks selected from the group consisting of furnace blacks and gas blacks, and blends thereof.

17. The pigment preparation of claim 15, wherein the preparation is in the form of powder, granulate, or presscake.

18. A composition comprising the pigment preparation of claim 17, and water, or an organic solvent, or a mixture of water and organic solvent.

19. A pigmented material comprising the pigment preparation of claim 15.

20. A printed article or food packaging article comprising the pigmented material of 19.

21. The method of claim 1, wherein the acid value of the polyester resin is greater than 55 mg KOH/g.

22. The method of claim 1, wherein the reaction mixture comprises 80% to 95% by weight of at least one terephthalate polymer, based on the total weight of the composition.

* * * * *